US006198836B1

(12) United States Patent
Hauke

(10) Patent No.: US 6,198,836 B1
(45) Date of Patent: Mar. 6, 2001

(54) METHOD AND DEVICE FOR RECOGNIZING NON-UNROLLED FINGERPRINTS

(75) Inventor: Rudolf Hauke, Niederstotzingen (DE)

(73) Assignee: A-Tronic MGM AG, Zug (CH)

( * ) Notice: Subject to any disclaimer, the term of this patent is extended or adjusted under 35 U.S.C. 154(b) by 0 days.

(21) Appl. No.: 09/066,310

(22) PCT Filed: Jun. 16, 1997

(86) PCT No.: PCT/CH97/00241

§ 371 Date: Apr. 27, 1998

§ 102(e) Date: Apr. 27, 1998

(87) PCT Pub. No.: WO98/09246

PCT Pub. Date: Mar. 5, 1998

(30) Foreign Application Priority Data

Aug. 27, 1996 (CH) .................................................. 2099/96

(51) Int. Cl.[7] ................................................. G06K 9/00
(52) U.S. Cl. ........................................... 382/125; 382/126
(58) Field of Search ............................. 382/115, 124–127

(56) References Cited

U.S. PATENT DOCUMENTS

| | | | |
|---|---|---|---|
| 3,668,633 | * | 6/1972 | Sadowsky ............................ 382/126 |
| 4,573,193 | * | 2/1986 | Shuto et al. ......................... 382/115 |
| 4,876,725 | * | 10/1989 | Tomko ................................ 382/126 |
| 5,073,950 | * | 12/1991 | Colbert et al. ...................... 382/115 |
| 5,335,288 | * | 8/1994 | Faulkner ............................. 382/115 |

OTHER PUBLICATIONS

K. Asai, Y. Hoshino, N. Yamashita, S. Hiratsuka "Fingerprint Identification System," Second USA–Japan Computer Conference, pp. 30–35, 1975.

H. Yoshikawa, S. Ikebata, "A Microcomputer–Based Personal Identification System," 1984 International Conference on Industrial Electronics, Control and Instrumentation, pp. 105–109, 1984.

M. Takeda, S. Uchida, K. Hiramatsu, T. Matsunami, "Finger Image Identification Method for Personal Verification," 10th International Conference on Pattern Recognition, pp. 761–766, 1990.

* cited by examiner

Primary Examiner—Bhavesh Mehta
(74) Attorney, Agent, or Firm—Oppedahl & Larson LLP

(57) ABSTRACT

For the better identification of not-enrolled fingerprint images, images of skin lines of two juxtaposed fingers (1, 2) of a hand are recorded. The orientations of the finger longitudinal axes (L1, L2) with respect to the normal direction (N) are determined and by means of a guidance means (13) a rotation or twisting (W1) of the fingers about their longitudinal axis is largely avoided, so that virtually coinciding, defined partial image quantities (B3, B4) of the complete enrolled fingerprint (A) are detected and transferred by evaluation algorithms into a reduced data quantity. This allows a much greater identification reliability with a smaller storage requirement and simpler evaluation algorithms.

19 Claims, 5 Drawing Sheets

METHOD AND DEVICE FOR RECOGNIZING NON-UNROLLED FINGERPRINTS

BACKGROUND

The invention relates to a method and an apparatus for the identification of not-enrolled fingerprints. Numerous methods and apparatuses are known, which allow the identification of a fingerprint. Generally the finger is pressed against a suitable optical device for producing contrast and e.g. by means of prisms and the inhibited total reflection principle, an image of the skin lines is produced. For example a digital grey value image is recorded, which is converted into a binary image and compressed by means of suitable algorithms to a biometric pattern with a relatively small storage requirement, which can then be compared with stored finger patterns of an associated data bank for identification purposes. The identification of fingerprints by enrolled finger line images is well established and proven in the police field. However, an increasing number of non-police uses require not-enrolled fingerprints. Thus, in most cases it is not possible or desirable to prescribe the enrolling of the fingerprint. In fact in many cases it is legally forbidden. In the case of not-enrolled fingerprints, which are required for normal applications, a very serious problem arises. Thus, if the orientation of the finger with respect to its longitudinal axis, i.e. a twisting or turning of the finger relative to the image recording surface occurs, then completely different partial image quantities of a complete enrolled fingerprint are identified, as a function of the twisting or rotation angle of the finger applied. In an extreme case this can mean that the identified partial image quantity of the surface of the finger on rotating the finger about its axis by e.g. +20° and −20° leads to a common image section quantity of these positions, which makes it impossible in practice to identify with the mathematical method used as a basis the person in question with an adequate accuracy using the differently applied finger. Thus, the information still contained in the common image section quantity can be too small to allow a reliable identification.

The problem of the invention is to give a method and an apparatus enabling this serious difficulty to be overcome and which allow a considerably increased identification reliability and accuracy and this is to be performable with a relatively small storage requirement for a significant pattern.

SUMMARY OF THE INVENTION

According to the invention this problem is solved by a method according to claim 1 and by an apparatus according to claim 17. Images of skin lines of two juxtaposed fingers of a hand are recorded, the orientations of the longitudinal axis L1, L2 being determined or are to be determined and in which the rotation of the finger about its longitudinal axis is largely avoided by a guidance means, so that the fingers are held virtually in the normal position and consequently clearly defined, almost identical partial image quantities of the entire enrolled fingerprint images are detected and transferred by suitable evaluation algorithms into a reduced data quantity. As a result of the unrotated position and the determination of the finger longitudinal axes, the evaluation algorithms become simpler, because generally more complicated algorithms are required in the case of an undefined finger longitudinal axis and which are rotation-independent, i.e. of the Lorenz type. The method according to the invention on the one hand gives simpler algorithms and on the other makes it possible for the same memory size to determine more significant patterns. Simultaneously through the detection of the image informations of two fingers the false acceptance rate FAR and false reject rate FRR are significantly improved. If e.g. the FAR in a method is 1:1000 per finger, the reliability of identification through the use of two fingers is 1:1 million. Or, conversely, it is possible to obtain the same identification reliability with simpler features of both fingers.

The dependent claims relate to advantageous further developments of the invention with further improvements concerning system expenditure, storage requirements, identification reliability and also with regards to the making and evaluation of picture records.

DESCRIPTION OF THE DRAWING

The invention is described in greater detail hereinafter relative to embodiments and the attached drawings, wherein show.

DETAILED DESCRIPTION

Figure 1A:
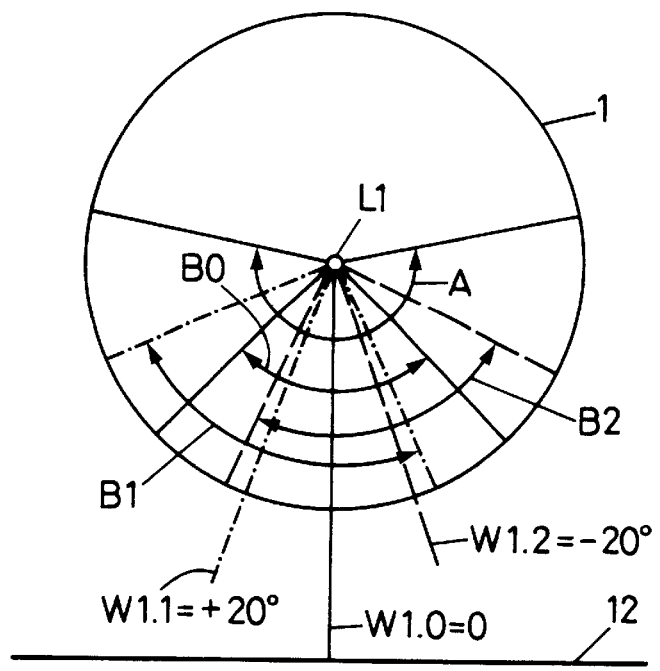
FIGS. 1a to c The partial image quantities of not-enrolled fingerprints as a function of the rotation about the finger longitudinal axis.
Figure 1B:
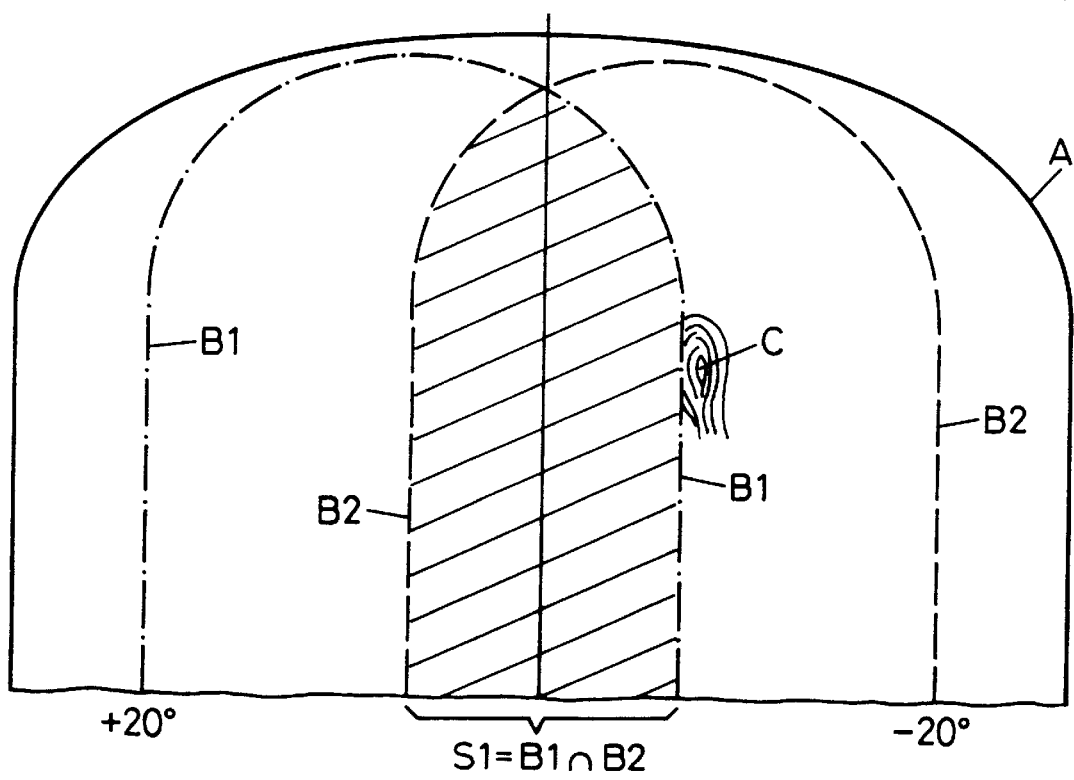
Figure 1C:
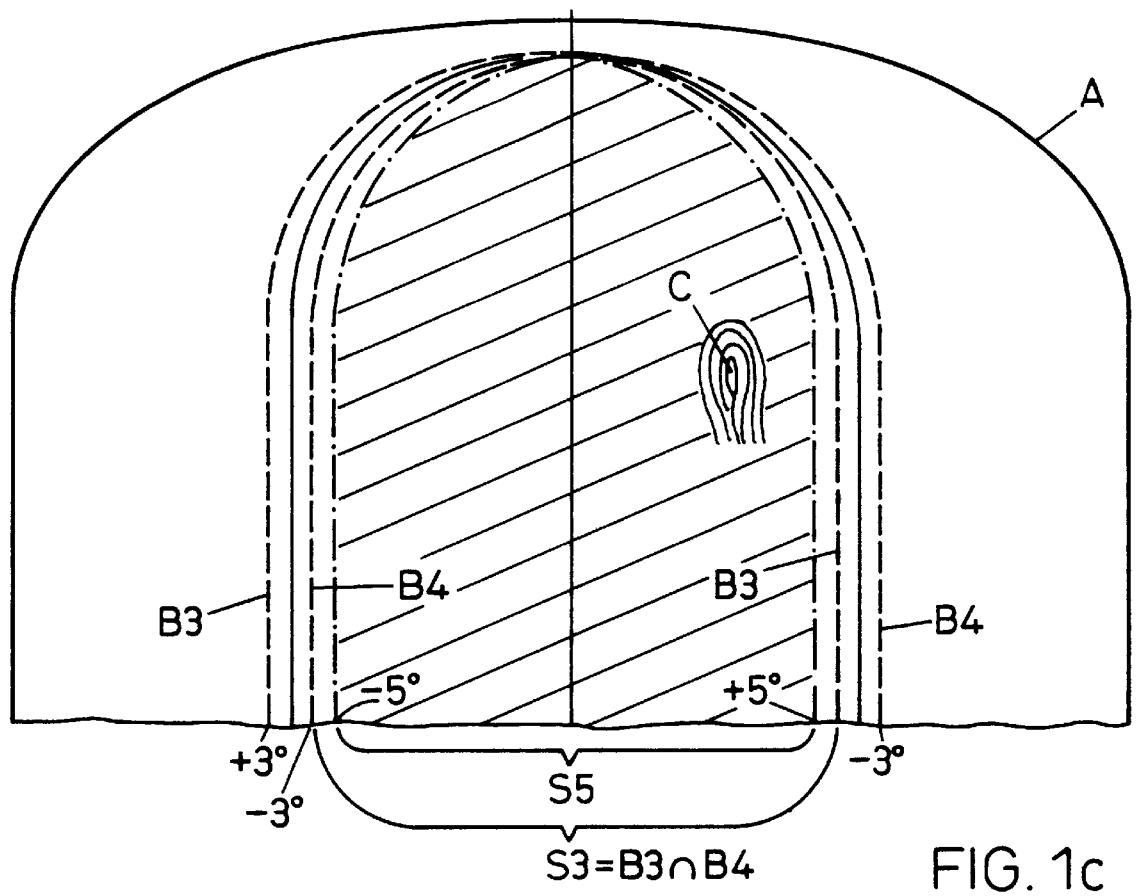

FIG. 1 illustrates partial image quantities of not-enrolled fingerprints as a function of the rotation W1 around the finger longitudinal axis L1. FIG. 1a diagrammatically shows on a finger 1 in cross-section, which partial image quantities B0 to B2 are recorded and evaluated as a function of the rotation W1 about its longitudinal axis L1. The complete enrolled fingerprint image hereby extends over the area A. In the case of simple, not-enrolled support of the finger on an image recording plate 12, in accordance with the rotation angle W1, different partial image quantities B0 to B4 are obtained, as shown in FIGS. 1b and 1c. In the case of an unrotated finger with W1.0=0, the partial image area B0 is recorded.

Figure 4:
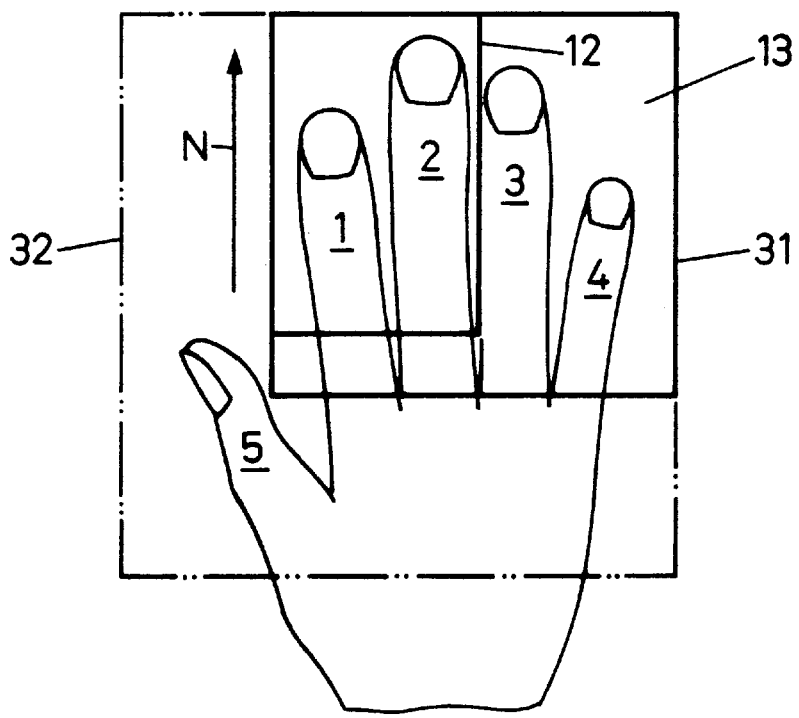
FIG. 4 Support surfaces as guidance means for the rotation-free supporting of the fingers.
Figure 5:
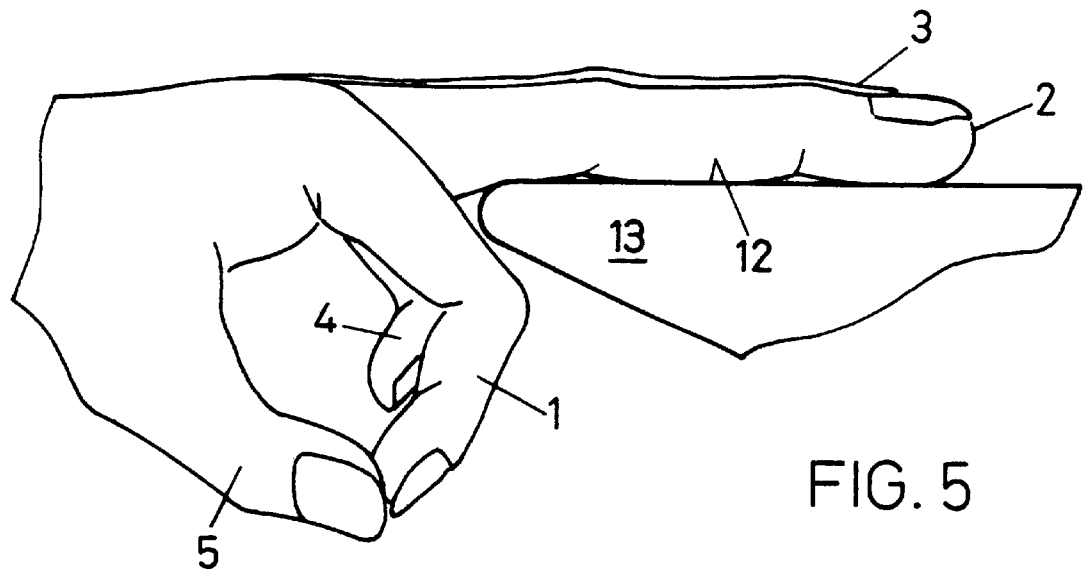
FIG. 5 A further example of a guidance means.

The rotation guidance means 13 illustrated in exemplified manner in FIGS. 4 and 5 are used for bringing the recording fingers 1, 2 as close as possible to said position B0. However, if only a single finger and in relatively random manner is placed on an image recording plate, then in arbitrary form more or less large rotation angles W1 occur.

In the case of a greatly turned or twisted finger, e.g. by W1.1=+20° and W1.2=−20°, correspondingly widely differing partial image quantities B1 and B2 are recorded, so that the common image area, i.e. the section quantity S1 of B1 and B2 is very small. Thus, in said section quantity S1 there are very few features which can be identified and a reliable identification of the fingerprint is not possible. Thus, e.g. it would not even be possible to identify the core position C in the example of B1 (FIG. 1b). In the case of the orientation of the two recording fingers in accordance with the invention, said rotation is significantly reduced to e.g. +3° to −3°, so that according to the example of FIG. 1c substantially identical partial image quantities B3, B4 with correspondingly large section quantities S3 of B3 and B4 are identified, which reliably always contain the core position C and which consequently allow a much simpler and more reliable evaluation and identification of the fingerprints.

During evaluation this can e.g. be taken into account in that with the algorithms only a partial image quantity corresponding to a section quantity, e.g. S3 with W1=+30° and −3° or a section quantity S5 with W1=+5° and −5° is used for simplified evaluation. This selection could also be inputted as parameters.

Figure 2:
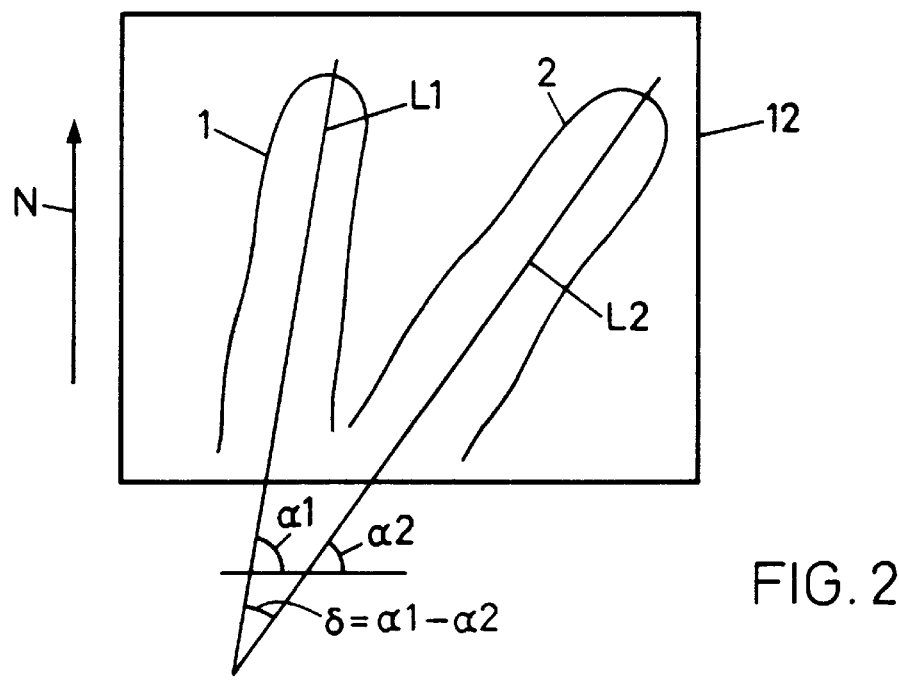
FIG. 2 A determination of the finger longitudinal axes.

FIG. 2 illustrates the determination of the finger longitudinal axes L1, L2, if the two recording fingers 1, 2 are not defined and parallel and are instead placed relatively freely and with an aperture angle δ on the support surface 12. For this purpose a centroid line L1 and L2 is determined for each finger and from the same it is possible to approximately determine their orientation α1, α2 relative to the normal direction N and aperture angle δ=α1−α2. In this way the fingerprint images can more simply be calculated back to the normal position.

According to the invention identification is particularly simple and reliable if the recording fingers 1, 2 are aligned in the normal direction N (i.e. with α1=α2=0), as will be explained hereinafter.

As stated, the principle of the invention is that the two recording fingers are also twice guided or positioned:

firstly with the guidance means 13 in such a way that there should be no rotation about W1 and secondly in that the finger longitudinal axes L1, L2 are detected and used for simpler evaluation.

Figure 6:
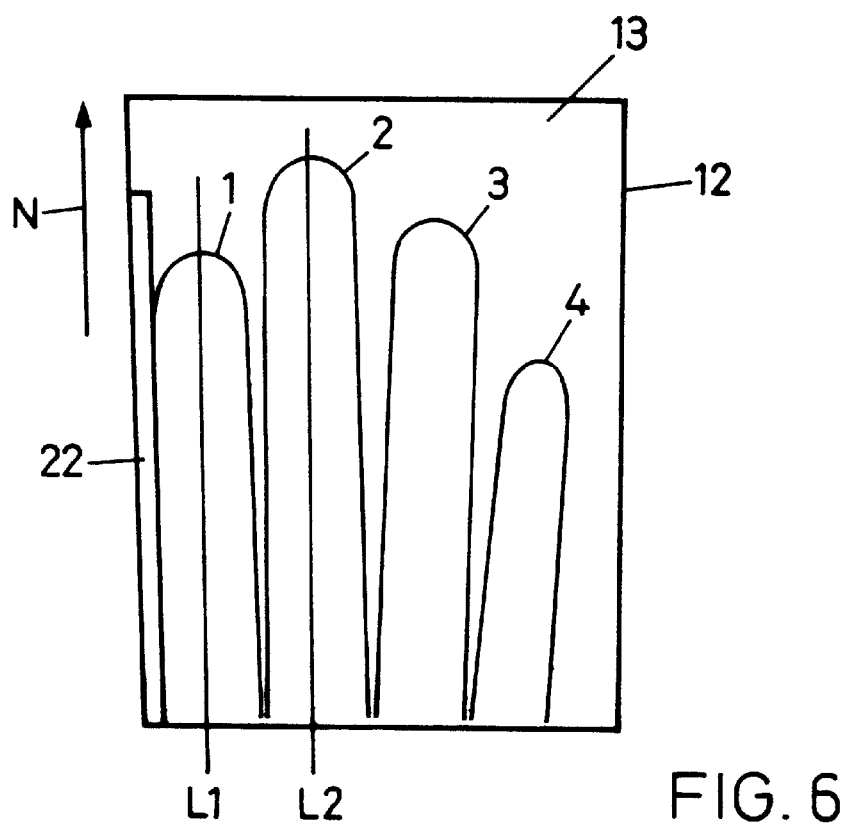
FIG. 6 A support plate with lateral stop face for parallel guidance purposes.
Figure 7:
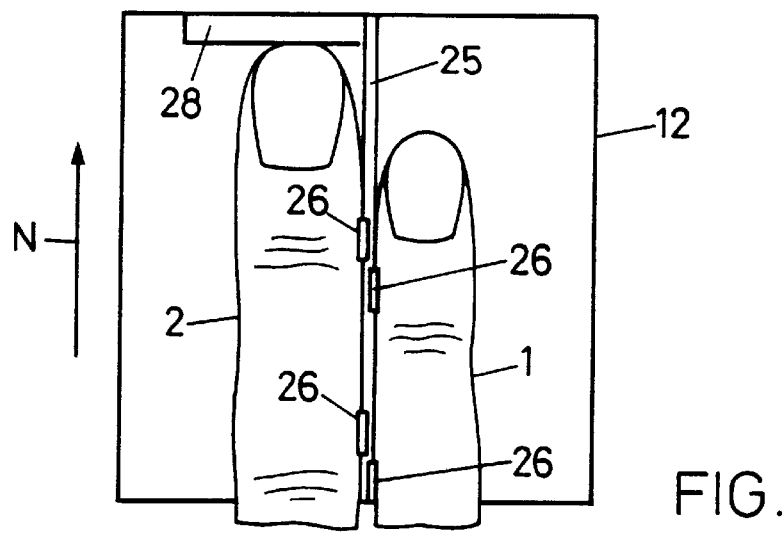
FIG. 7 A support plate with register rail.

This rotation-free guidance 13 is illustrated in FIGS. 4 and 5 and the parallel guidance in FIGS. 6 and 7.

Figure 3:
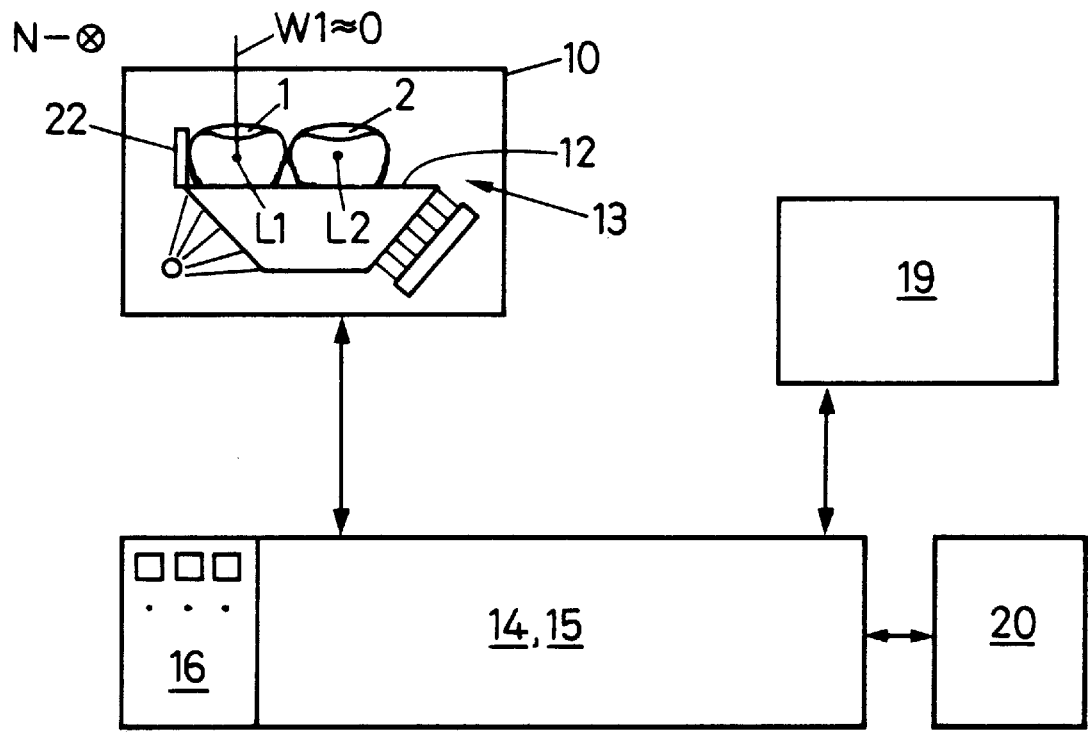
FIG. 3 An apparatus according to the invention.

FIG. 3 diagrammatically shows an apparatus according to the invention for performing the method with an image recording device 10, an evaluating electronics 14, evaluation algorithms 15 and an associated data bank 19 with stored, comparison fingerprint patterns. The apparatus also contains an input and output device 16 (e.g. for inputting parameters, for operator guidance and result display), as well as a connection to a master system 20. The recording of the finger lines e.g. takes place by means of total reflection on a prism which serves as an image recording plate 12. A digital grey value image is recorded in an image processing module and from it is derived a binary image with reduced storage volume and from same using suitable algorithms a biometric pattern with relatively small capacity requirement is determined. The apparatus has guidance means 13, through which the recording fingers 1 and 2 are aligned with respect to their longitudinal axes L1, L2 in unturned or untwisted manner (with W1≈0). Thus, the recording fingers are positioned parallel to the hand plane. The unrotated alignment of the recording fingers is brought about in that two juxtaposed fingers are used for image detection purposes on the support plate 12.

Further examples of rotation guidance means 13 are explained relative to FIGS. 4 and 5. According to FIG. 4 the guidance means 13 can be e.g. constituted by a planar support surface 31 for at least four fingers 1 to 4 of a hand, i.e. from the index to the small finger, so that all four fingers rest flat and unturned on the support surface and in which only one partial surface area 12 of the support surface is constructed as an image recording plate for the two recording fingers 1 and 2 (e.g. index finger and middle finger). Alternatively a support surface 32 can be provided for the whole hand, so that the whole hand is supported flat and all the fingers 1 to 4 are untwisted, as is shown as an alternative.

In FIG. 5 the support can also be constructed in such a way that only the two recording fingers rest on the recording plate 12 (here e.g. the middle finger 2 and ring finger 3) and the remaining fingers 1, 4 of the hand are bent by suitable shaping 13 and aligned in parallel below the support plate.

As shown in FIGS. 6 and 7, additionally also the finger longitudinal axes L1, L2 are defined by means of parallel guidance means 22, 25. In the case of particularly advantageous constructions, the normal position of the recording fingers is ensured by corresponding guidance surfaces. According to FIG. 6 this is a lateral stop face 22 defining the normal direction N (α=0), to which the outside of a recording finger 1 can be applied parallel to said normal direction. When the fingers are closed also finger 2 has a parallel alignment.

In a further variant according to FIG. 7 a thin register rail 25 is provided in the normal direction N and to it the inside of both recording fingers 1, 2 can be applied to both sides. Thus, the thin rail 25 is squeezed by both fingers. To ensure that the fingers are on both sides positioned on the register rail, on both sides sensors 26 can monitor and ensure the contact with both fingers. The use of such a parallel guidance means 22, 25 is particularly advantageous, because it fixes the orientation of the fingers with respect to the detecting optical unit and consequently the evaluating algorithms are made correspondingly simpler.

The juxtaposed recording fingers can naturally also be the middle and ring fingers (2, 3) or ring and small fingers (3, 4). It would even be conceivable to use fingers 1 and 3 or 2 and 4, but in practice would be more complicated and less accurate.

Figure 8:
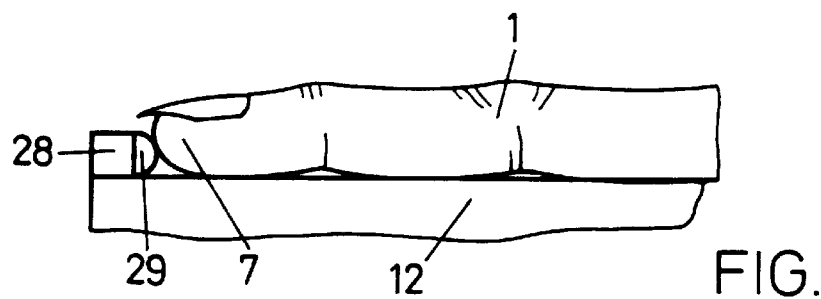
FIG. 8 A front stop with sensor.

As additional positioning means FIGS. 7 and 8 show from the side a front register rail 28 with a pressure sensor 29, with which it is possible to detect and control a predeterminable contact pressure range or force range of e.g. 1 to 3N and with which the fingers must be applied for image recording purposes. Advantageously the front stop only acts on the finger pad 7, so that the finger 1 does not engaged with the fingernail and consequently the finger position is not dependent on the different fingernail length.

In general, further sensors could be used in combination with the guidance means for optimizing and controlling the positioning of the recording fingers according to the invention.

According to the invention, further geometrical parameters can be used for increasing the accuracy of identification, as described hereinafter. Thus, in addition, for each person use can be made of typical geometrical finger contours in such a way that from the individual fingerprint image the core position or other relevant reference points, e.g. the centre of gravity are determined and related to one another.

Figure 9:
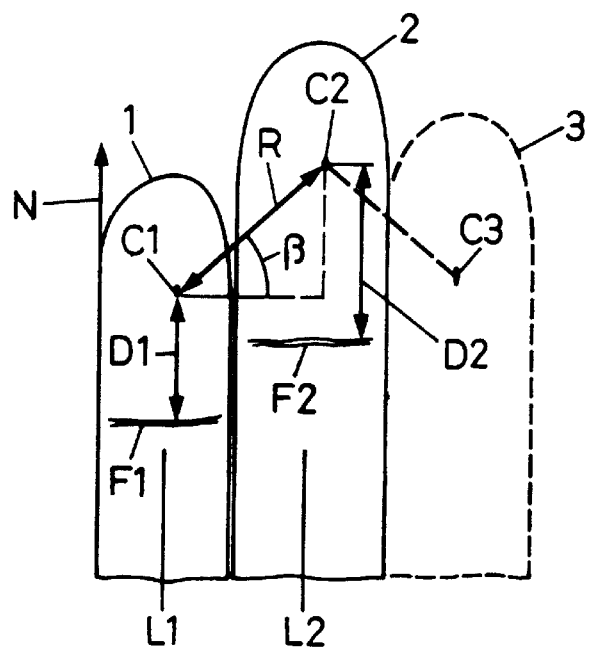
FIG. 9 The determination of the core positions.

FIG. 9 illustrates as an advantageous embodiment the use of the core positions C1, C2 of both fingers as important primary biometry data and from the core positions it is also possible to determine the spacing vector, i.e. the spacing R and its direction A as measurement parameters. In addition, e.g. also the spacings D1, D2 of the core positions relative to the joint folds F1, F2, here the top joints, can be determined and used.

Such invariable informations concerning a person can be used during a search in a fingerprint data bank for simplifying the seeking of the relevant information and this can be considerably accelerated in that the data bank is so indexed that spacing and angular information or primary biometry data are used prior to the complete fingerprint information for diluting the data in question. Instead of only using the core position of two fingers, naturally three or four fingers could be used for identification purposes, as indicated at C3 in FIG. 9.

LIST OF REFERENCES

1–5 Fingers of a hand
1, 2 Recording fingers
7 Finger pad
10 Image recording device
12 Support plate, image recording plate
13 (rotation) guidance means
14 Evaluating electronics
15 Evaluation algorithms
16 Input/output device
19 Data bank
20 Master system
22 Lateral stop face
22, 25 Parallel guidance means (N)
25 Register rail
26 Contact sensors
28 Front stop
29 Pressure sensor
31 Support face for four fingers
32 Support face for whole hand
L1, L2 finger longitudinal axes
W1 rotation angle about L1
N Normal direction (with $\alpha=0$)
A Image area of the enrolled fingerprint
B, B0–B5 partial image quantities Image segments of not-enrolled fingerprints
S, S1, S3 Joint image section quantities
D1, D2 Spacing C–F
F Skin folds at joint
C Core positions
R Spacings C1–C2
$\alpha 1, \alpha 2$ Angles of L1, L2
$\delta = \alpha 1 - \alpha 2$
$\beta$ Angle of R

What is claimed is:

1. Method for the identification of not-enrolled fingerprint images, wherein images are recorded of skin lines of at least two juxtaposed fingers (1, 2) of a hand, orientations of finger longitudinal axes (L1, L2) are determined, and a rotation (W1) of the fingers about their longitudinal axis is largely prevented by a guidance means (13), so that during each identification process clearly defined, almost identical partial fingerprint image quantities (B3, B4) of skin lines of the two juxtaposed fingers of whole, enrolled fingerprints are detected, therefrom digital grey value images are determined and transferred by evaluation algorithms into a digital biometric pattern with a reduced data quantity.

2. Method according to claim 1, wherein the finger longitudinal axes (L1, L2) are determined by establishing centroid lines of each fingerprint image and from said longitudinal axes are determined their orientation angles ($\alpha 1, \alpha 2$) and their aperture angles $\delta = \alpha 1 - \alpha 2$.

3. Method according to claim 1, wherein the finger longitudinal axes (L1, L2) are kept parallel and in a normal direction N by a parallel guidance means ($\alpha 1 = \alpha 2 = 0$).

4. Method according to claim 1, wherein core positions (C1, C2) of the at least two fingers (1, 2) are determined and from said core positions a spacing (R) and direction ($\beta$) are established.

5. Method according to claim 1, wherein further biometric parameters, comprising at least one of the following features: centers of gravity of fingerprints, spacings (D1, D2) and a relative position of the skin folds of the top joints, are determined.

6. Method according to claim 1, wherein an associated data bank with comparison patterns (19) is indexed to primary biometric data.

7. Method according to claim 6, wherein core positions (C), locations, angles and spacing details (D) are used as primary biometric data.

8. Method according to claim 1, wherein restricted image section quantities (S, S3) are used for evaluating with evaluation algorithms (15).

9. Apparatus for the identification of not-enrolled fingerprint images comprising an image recording device (10) for recording of skin lines of at least two juxtaposed fingers (1, 2) of a hand with a support plate (12) on which the two recording fingers (1, 2) are positioned in unturned manner relative to their longitudinal axes (L1, L2) by guidance means (13) and where orientations of finger longitudinal axes (L1, L2) are determined and an evaluating electronics (14) for determining digital grey value images, and with evaluation algorithms (15) for defining and evaluating features of the at least two digital fingerprint images and for reduction into a biometric pattern with a reduced data quantity and an associated data bank (19) with comparison patterns.

10. Apparatus according to claim 9, wherein the guidance means (13) are constituted by a planar support surface for at least four fingers of a hand (31) or for the whole hand (32), whereof a surface part area is constructed as an image recording plate (12) for the two recording fingers (1, 2).

11. Apparatus according to claim 9, wherein a lateral stop face (22) defining the normal direction (N) is placed on the support plate and to which an outside of a recording finger can be applied, parallel to a normal direction.

12. Apparatus according to claim 9, wherein the guidance means is constituted by a register rail (25) in a normal direction (N) and to which on either side the inside of both recording fingers (1,2) can be applied.

13. Apparatus according to claim 12, wherein the fingers (1, 2) each have sides, characterized in that sensors (26) on the register rail (25) on both sides monitor contact with respective sides of the fingers (1, 2).

14. Apparatus according to claim 9, wherein one finger (1, 2) is longer than the other finger (1, 2) and wherein a front stop (28) for the longer finger is provided.

15. Apparatus according to claim 14, wherein the front stop (28) is in contact with a finger pad (7) of the longer finger below a fingernail.

16. Apparatus according to claim 14, wherein on the front stop (28) a clearly defined pressure range for the contact with the finger of 1 to 2N can be set by means of a sensor (29).

17. Method for the identification of not-enrolled fingerprint images, wherein images are recorded of skin lines of at least two juxtaposed fingers (1,2) of a hand, orientations of finger longitudinal axes (L1, L2) are determined by establishing centroid lines of each fingerprint image and from said longitudinal axes are determined their orientation angles ($\alpha 1, \alpha 2$) and their aperture angle $\delta = \alpha 1 - \alpha 2$, and a rotation (W1) of the fingers about their longitudinal axis is largely prevented by a guidance means (13), so that during each identification process clearly defined, almost identical partial image quantities (B3, B4) of whole, enrolled fingerprints are detected therefrom digital grey value images are determined and transferred by evaluation algorithms into a digital biometric pattern with a reduced data quantity.

18. Method for the identification of not-enrolled fingerprint images, wherein images are recorded of skin lines of at least two juxtaposed fingers (1,2) of a hand, orientations of finger longitudinal axes (L1, L2) are determined or will be determined and a rotation (W1) of the fingers about their longitudinal axis is largely prevented by a guidance means (13), so that during each identification process clearly defined, almost identical partial image quantities (B3, B4) of whole, enrolled fingerprints are detected therefrom digital grey value images are determined and transferred by evaluation algorithms into a digital biometric pattern with a reduced data quantity, wherein restricted image section quantities (S, S3) are used for evaluating with evaluation algorithms (15).

19. Method for the identification of not-enrolled fingerprint images, wherein images are recorded of skin lines of at least two juxtaposed fingers (1, 2) of a hand, orientations of finger longitudinal axes (L1, L2) are determined and a rotation (W1) of the fingers about their longitudinal axis is largely prevented by a guidance means (13), so that during each identification process clearly defined, almost identical partial fingerprint image quantities (B3, B4) of skin lines of the two juxtaposed lingers of whole, enrolled fingerprints are detected and transferred by evaluation algorithms into a digital biometric pattern with a reduced data quantity, said pattern including core positions (C1, C2) of the two juxtaposed fingers and a spacing (R) and a direction (β) of the core positions.

* * * * *